(12) United States Patent
Oshima et al.

(10) Patent No.: US 6,804,460 B1
(45) Date of Patent: Oct. 12, 2004

(54) LENS TURRET WITH BACK FOCAL LENGTH ADJUSTMENT

(75) Inventors: Shigeru Oshima, Tokyo (JP); Yoshio Yamazaki, Kanagawa (JP)

(73) Assignee: Arc Design, Inc., Tokyo (JP)

( * ) Notice: Subject to any disclaimer, the term of this patent is extended or adjusted under 35 U.S.C. 154(b) by 0 days.

(21) Appl. No.: 10/675,616

(22) Filed: Sep. 30, 2003

(51) Int. Cl.$^7$ .............................................. G03B 17/00
(52) U.S. Cl. ........................................ 396/74; 348/335
(58) Field of Search ............................ 396/73–75, 429; 348/335, 340, 369, 552

(56) References Cited

U.S. PATENT DOCUMENTS 6,134,393 A * 10/2000 Melman ...................... 396/429
2003/0002867 A1 * 1/2003 Ojala ........................... 396/73

* cited by examiner

Primary Examiner—David M. Gray
(74) Attorney, Agent, or Firm—Senniger Powers

(57) ABSTRACT

An optical apparatus to be used for digital still cameras for setting any one of a plurality of lenses in a picture taking (image capturing) position comprising a lens turret rotatable around an axis and having the lenses mounted thereon, a driving mechanism to rotate the lens turret so that one of the lenses can be set at the picture taking position and a means to adjust and extend the back focal length of the lens shaped like a column or square column and made of glass, plastic or the like that has higher refraction index than that of air. By said means of back focal length adjustment, the position of the lens with shorter focal length can be fixed on the lens turret moving apart from the image sensor like CCD or C-MOS upward without changing its focal length itself, and fixed at the same level thereon as the lens with longer focal length. With this adjustment of back focal length, the lenses can be fixed on the turret as closely as possible with each other, yet any part of one lens does not cut in or disturb any part of light path of the other lens. Consequently the total size of lens turret could be minimized.

4 Claims, 3 Drawing Sheets

LENS TURRET WITH BACK FOCAL LENGTH ADJUSTMENT

BACKGROUND OF THE INVENTION

1. Field of the Invention

The present invention relates to an optical apparatus that has a plurality of lenses and is used for digital still cameras. In the optical apparatus, by providing additionally a kind of optical element made of glass, plastic or the like that has a higher refractive index than that of air and by inserting said element between the rearmost element of lens and the image sensor the back focal length of the lens to with shorter back focal length can be extended without changing its focal length itself.

2. Background Art

A lens turret is popularly used to obtain multiple focal lengths in a camera. However, in the case of digital still cameras (hereinafter referred to as DSC) or especially in the case of mobile phone DSC, lens modules are required to be extremely small due to the limited space for the lens module. Conventional lens turrets usually have two or three lenses of different focal lengths, and the lenses are fixed on a disk surrounding an axis, and the disk is rotatable around the axis so that one of the lenses can be set at the picture taking position. In the conventional lens turrets, the lenses are simply fixed on the disk, so the heights of lenses are all different. The lens with longer focal length is much higher than the lens with shorter focal length. FIG. 1 shows how different the heights of two lenses are as a common example. Moreover, if the lenses are positioned closely each other surrounding the axis, the lens barrel of longer focal length lens (hereinafter referred to as a telephoto lens) cuts in and disturb the light path of the shorter focal length lens (hereinafter referred to as a wide-angle lens) as shown by FIG. 2, because both of the lenses are placed at the same level on the disk. Consequently, there is a limit for shortening the distance between the lens positions, and that makes it difficult for the total size of lens turret to be compact. If the lenses are so positioned as not to disturb their light paths with each other, they should be positioned as shown in FIG. 3, and the distance between the two lenses should be much longer than the distance of the case shown in FIG. 2.

It is therefore an object of this invention to provide a lens turret that is much smaller area-wise, and much lower and flat height-wise.

SUMMARY OF THE INVENTION

A primary object of the present invention is to provide a lens turret that is extremely compact and flat in size and suitable for digital still cameras and mobile phone digital cameras comprising a lens turret rotatable around an axis and having plurality of lenses mounted thereon, a driving mechanism to rotate the lens turret so that one of the lenses can be set at the picture taking position, and a means to adjust and extend the back focal length of the wide-angle lens shaped like a column or square column and made of glass, plastic or the like that has higher refraction index than that of air.

Lenses are designed having a back focal length, which is the distance between the rearmost lens element and the focal plane of image sensor. This distance is fixed when the design was finalized. Usually when designing lenses, the designer considers the space between the rearmost element and the image sensor being filled by air, and uses the refractive index of air for his design calculation. It is a well-known fact that if an additional optical element that has a higher refractive index than that of air is inserted between the rearmost element and the image sensor, the back focal length of the lens is extended to some extent, and yet the focal length itself is not changed at all.

By making use of this phenomenon of back focal length extension, and by inserting an additional optical element between the lens and image sensor, the lens can be placed farther apart from the image sensor than its original position.

By using an additional element made of a material with a higher refractive index than the refractive index of air being placed between the lens and the image sensor, the present invention enables the lens turret to have the wide-angle lens placed higher in position than its original position so that the wide-angle lens can be placed almost at the same level as the telephoto lens, and when they are built in a DSC, the telephoto lens does not protrude and at the same time the distance between the both lenses can be closer preventing the telephoto lens barrel from disturbing the light path of the wide-angle lens so that the total size of the lens turret can be much more compact.

DETAILED DESCRIPTION OF THE INVENTION

As described hereinbefore, the back focal length can be extended by inserting an additional element which is made of a glass, plastic or the like that has a higher refractive index than that of air. And the extension can be calculated using formulas as follows.

Thickness of the additional element=T
Refractive index of the additional element=RI
Original Back focal length=BFL1
Extended distance=ED
Extended back focal length=BFL2

$$T - T/RI = ED$$

and $$BFL + ED = BFL2$$

Figure 1:
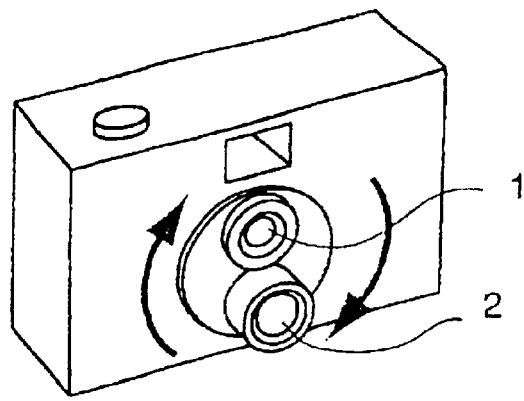
FIG. 1 is a perspective view of a camera with a conventional lens turret.
Figure 4:
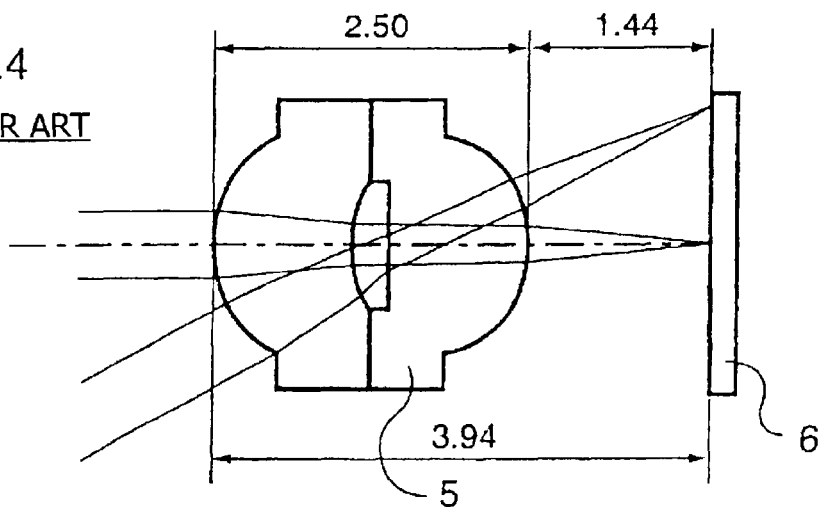
FIG. 4 is an example design of a wide-angle lens to be used for the lens turret.

Using a sample design of a wide-angle lens as shown in FIG. 4, of which specifications are as follows, and an additional element of 1.5 mm thick made of optical glass with a refractive index of 1.52, if the back focal length adjustment is calculated, the result of calculation is as follows.

Lens specifications:
Fno=4.06
Focal length=2.15 mm
Back focal length=1.44 mm
Element=2 plastic aspherical elements $$ED = 1.5 - 1.5/1.52 = 0.513$$

and $$BFL2 = 1.44\ (BFL1) + 0.513 = 1.953$$

Figure 5:
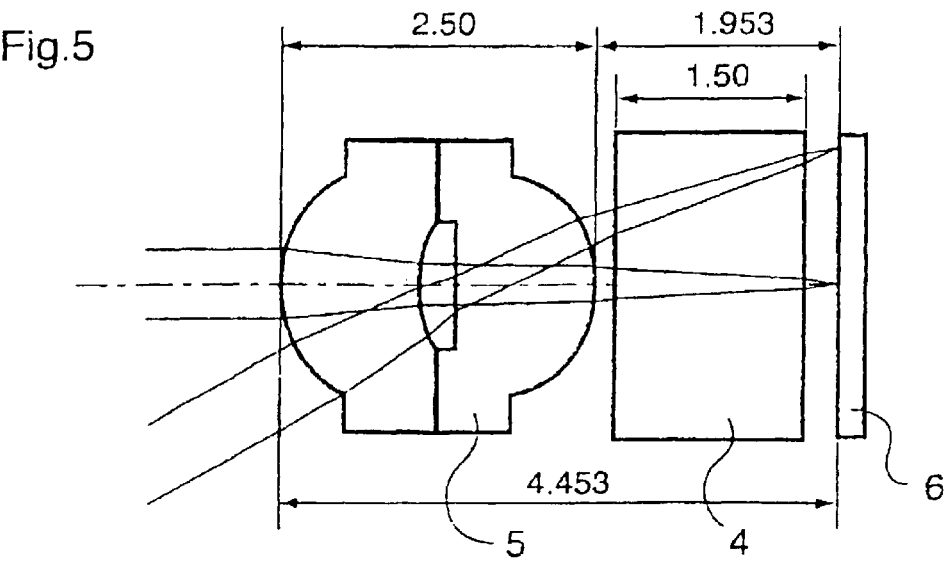
FIG. 5 is a modified design of the lens design of FIG. 4 using an additional element to adjust and extend the back focal length.

As calculated above, for the original back focal length of 1.44 mm, about 35.6% of extension can be obtained and the extended back focal length is 1.953 mm. Thus by inserting the additional element (4 shown in FIG. 5), the lens can be placed farther apart from the image sensor by 0.513 mm. As the result of this back focal length extension, the lens design can be changed from the design in FIG. 4 to the design in FIG. 5. In both the designs, the focal lengths of 2.15 mm are exactly the same and unchanged.

Figure 2:
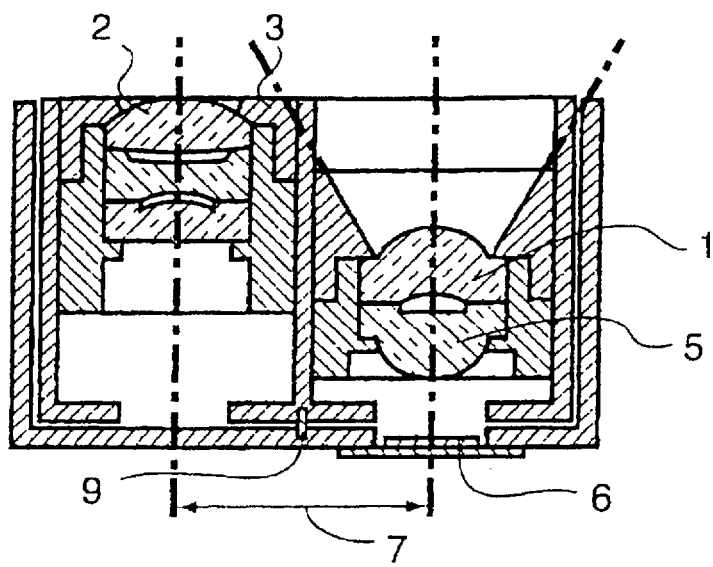
FIG. 2 is a partly cross-sectional view of the lens turret system in which both the wide-angle and telephoto lenses are too closely positioned each other and a part of light path of the wide-angle lens is cut and disturbed by a part of telephoto lens barrel.
Figure 3:
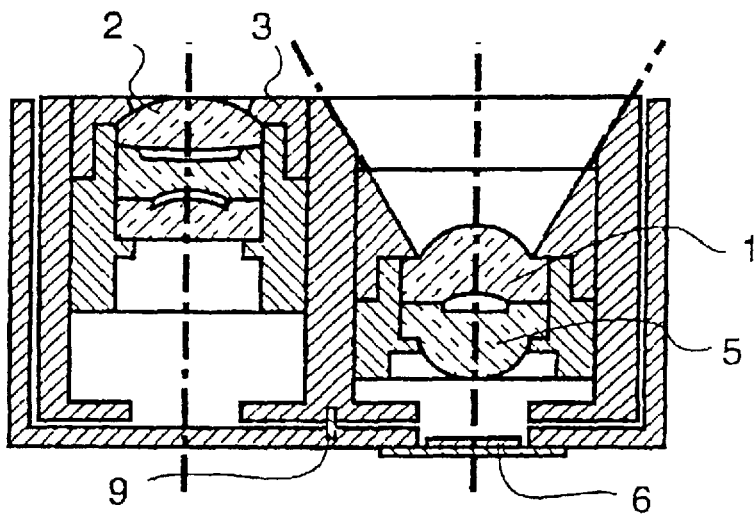
FIG. 3 is a partly cross-sectional view of the lens turret system in which both the wide-angle and telephoto lenses are positioned spaciously enough with each other so that any part of the light path of wide-angle lens may not be cut and disturbed by a part of telephoto lens barrel.
Figure 6:
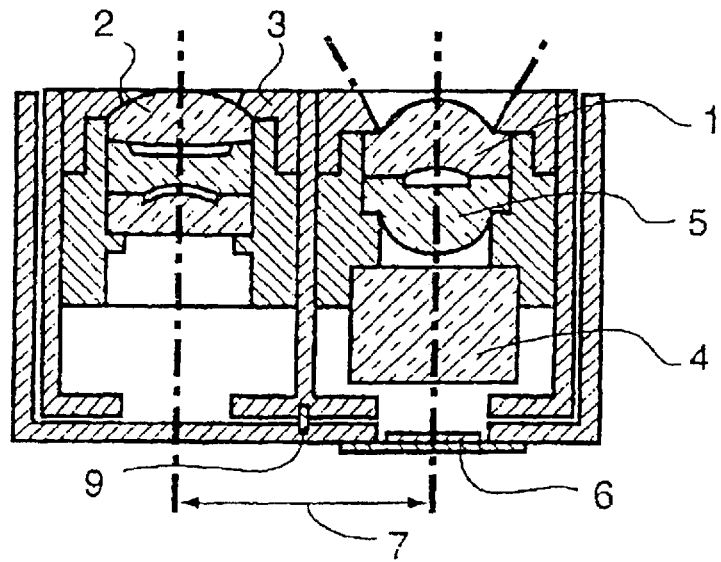
FIG. 6 is a partly cross-sectional view of the lens turret system in which both the wide-angle and telephoto lenses are very closely positioned each other using an additional element of back focal adjustment, and yet any part of light path of the wide-angle lens is not cut and disturbed by a part of telephoto lens barrel.

FIG. 3 shows the relative positions of the wide-angle lens (1) and the telephoto lens (2) when those lenses are positioned on the lens turret not to disturb the light path of each lens with each other without the additional element (4) to extend the back focal length of the wide-angle lens (1). FIG. 2 shows the status of both lenses which are positioned as close as possible without the additional element (4) to extend the back focal length and without considering that the lens barrel (3) of the telephoto lens (2) cuts a part of light path of wide-angle lens (1). FIG. 6 shows the status of the both lenses when the additional element (4) to extend the back focal length of the wide-angle lens (1) is inserted between the rearmost element (5) of the wide-angle lens (1) and the image sensor (6), and also shows the status that as the result of the inserting the additional element (4) the back focal length of the wide-angle lens (1) is extended and the wide-angle lens (1) is moved upward (forward) and yet the distance (7) between the both lenses can be the same as the distance (7) shown in FIG. 3. As shown in FIG. 6, now any part of the light path of the wide-angle lens (1) is not disturbed by any part of the telephoto lens (2).

Figure 7:
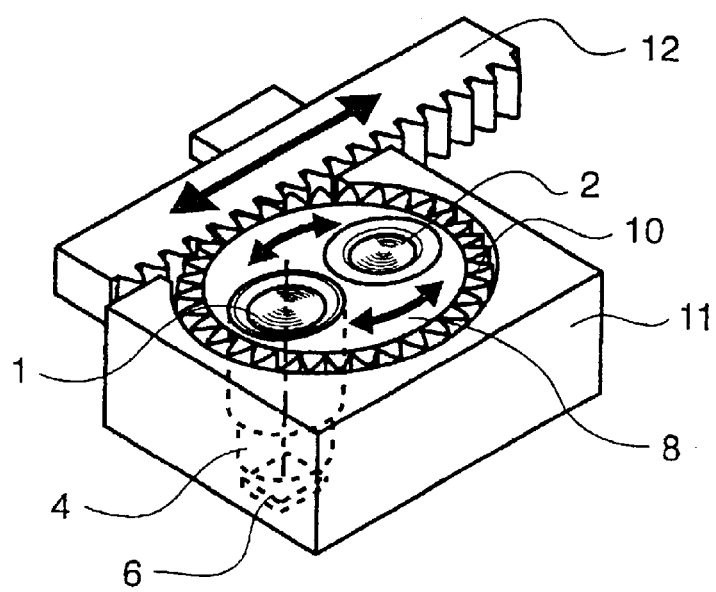
FIG. 7 is a perspective view of the lens turret of the first embodiment of the present invention in which the wide-angle lens is in the picture taking position.
Figure 8:
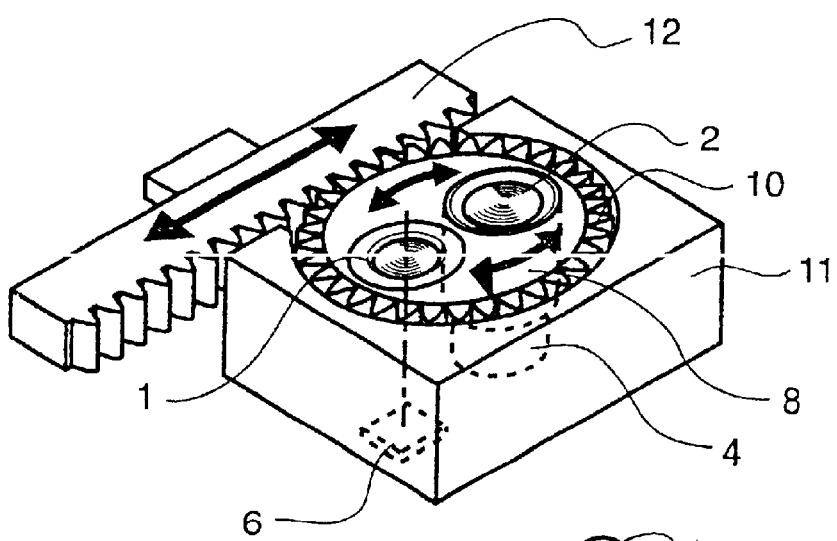
FIG. 8 is a perspective view of the lens turret of the first embodiment of the present invention in which the telephoto lens is in the picture taking position.
Figure 9:
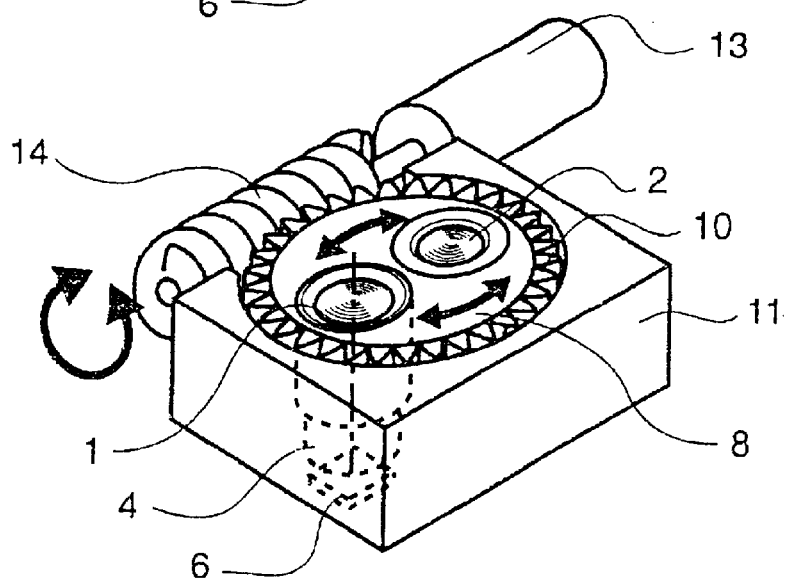
FIG. 9 is a perspective view of the lens turret of the second embodiment of the present invention in which the wide-angle lens is in the picture taking position.

FIG. 7 and FIG. 8 show a preferable embodiment of the present invention, namely the lens turret with back focal length adjustment, which comprises a wide-angle lens (1), a telephoto lens (2), a lens turret disk (8) rotatable around an axis (9) and having the lenses mounted thereon, an additional element (4) to adjust and extend the back focal length of the wide-angle lens (1), gear teeth (10) provided on the rim of the lens turret disk (8), a housing (11) in which all the wide-angle lens (1), the telephoto lens (2), the image sensor (6) and the lens turret disk (8) are assembled and a rack (12).

Since the means of back focal length adjustment, the additional element (4), is provided with the wide-angle lens (1) between the rearmost lens element of the wide-angle lens (1) and the image sensor (6), the wide-angle lens (1) is positioned almost at the same level as the telephoto lens (2) as shown in FIG. 6. The lens turret disk (8) is rotatable around the axis (9), and on the rim of the lens turret disk (8) the gear teeth (10) are provided and they are engaged with the teeth of the rack (12). The two lenses are moved by rotation of the lens turret disk (8) so that one of them comes to the picture taking (image capturing) position. When the rack (12) is moved manually sliding from side to side, the lens turret disk (8) rotates and moves the lenses, and one of the lenses stops at a picture taking position above the image sensor (6) with a click stop. If the rack (12) is moved in a reverse direction the other lens comes to the picture taking position. Thus by using the means of back focal length adjustment, namely the additional element (4) made of glass, plastic or the like that has a higher refractive index than the refractive index of air and by keeping the additional element (4) just underneath the rearmost element (5) of the wide-angle lens (1) between the rearmost element (5) and the image sensor (6), the wide-angle lens (1) can be placed farther upward (forward) apart from the image sensor (6) so that the both lenses can be positioned almost at the same level and the distance (7) shown in FIG. 6 between the both lenses can be minimized. Consequently the total size of the lens turret can be as compact as possible.

FIG. 10 shows another preferable embodiment of the present invention, namely the lens turret with back focal length adjustment, which comprises a wide-angle lens (1), a telephoto lens (2), a lens turret disk (8) rotatable around an axis (9) and having the lenses mounted thereon, an additional element (4) to adjust and extend the back focal length of the wide-angle lens (1), gear teeth (10) provided on the rim of the lens turret disk (8), a housing (11) in which all the wide-angle lens (1), the telephoto lens (2), the image sensor (6) and the lens turret disk (8) are assembled, and a DC motor (13) with a worm screw (14) fixed with the motor shaft.

Since the means of back focal length adjustment, the additional element (4), is provided with the wide-angle lens (1) between the rearmost lens element of the wide-angle lens (1) and the image sensor (6), the wide-angle lens (1) is positioned almost at the same level as the telephoto lens (2) as shown in FIG. 6. The lens turret disk (8) is rotatable around the axis (9), and on the rim of the lens turret disk (8) the gear teeth (10) are provided, they are engaged with the worm screw (14) fixed with the motor shaft. The two lenses are moved by rotation of the lens turret disk (8) so that one of them comes to the picture taking (image capturing) position. When the DC motor (13) rotates, the worm screw (14) rotates and the lens turret disk (8) rotates and moves the lenses, and one of the lenses stops at a picture taking position above the image sensor (6) with a stopper. If the motor (13) rotates in a reverse direction the other lens comes to the picture taking position. Thus by using the means of back focal length adjustment, namely the additional element (4) made of glass, plastic or the like that has a higher refractive index than the refractive index of air and by keeping the additional element (4) just underneath the rearmost element (5) of the wide-angle lens (1) between the rearmost element (5) and the image sensor (6), the wide-angle lens (1) can be placed farther upward (forward) apart from the image sensor (6) so that the both lenses can be positioned almost at the same level and the distance (7) shown in FIG. 6 between the both lenses can be minimized. Consequently the total size of the lens turret can be as compact as possible.

What is claimed is:

1. An optical apparatus to be used for digital still cameras for setting any one of a plurality of lenses in a picture taking (image capturing) position, comprising:
   (a) a lens turret rotatable around an axis and having plurality of lenses mounted theron;
   (b) a driving mechanism to rotate the lens turret so that one of the lenses can be set at the picture taking position; and
   (c) an element to adjust and extend the back focal length of a lens with shorter focal length that is suitable for being inserted between the rearmost lens element and the image sensor, and is made of a material that has higher refraction index than that of air.

2. An optical apparatus as claimed in claim 1, wherein the driving mechanism to rotate the lens turret can be operated manually using gear teeth provided on the rim of lens turret disk, a rack, or a rack and pinion, and the rack can be moved by sliding from side to side manually.

3. An optical apparatus as claimed in claim 1, wherein the driving mechanism to rotate the lens turret can be operated by a motor using a worm and gear teeth provided on the rim of lens turret disk.

4. An optical apparatus as claimed in claim 1, wherein the element is shaped like a column.

* * * * *